Jan. 18, 1955
R. S. HAHN
2,699,696
TOOL CARRIER AND VIBRATION-DAMPING MEANS THEREFOR
Filed Nov. 26, 1948
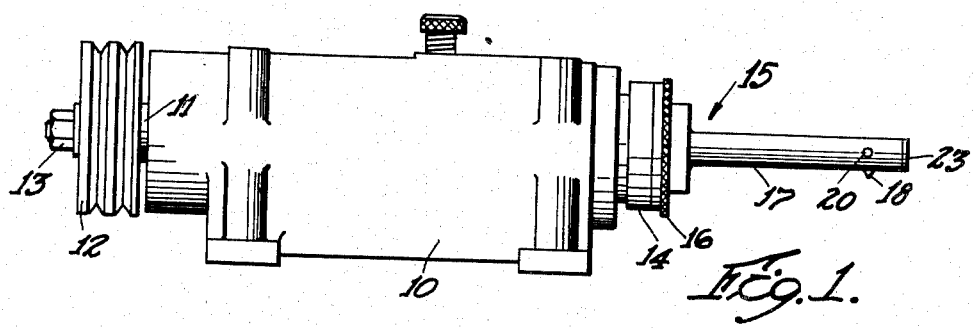
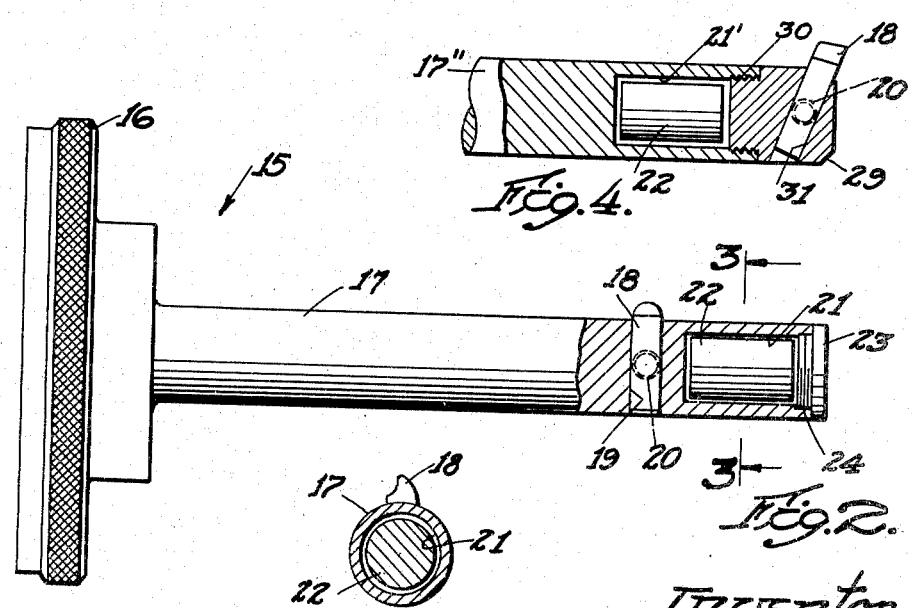
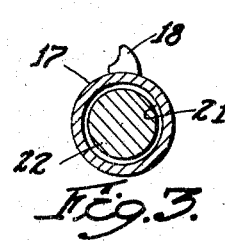

United States Patent Office 2,699,696
Patented Jan. 18, 1955

2,699,696

TOOL CARRIER AND VIBRATION-DAMPING MEANS THEREFOR

Robert S. Hahn, Northboro, Mass., assignor to The Heald Machine Company, Worcester, Mass., a corporation of Massachusetts Application November 26, 1948, Serial No. 61,995

1 Claim. (Cl. 77—58)

The present invention relates to tool carriers and more particularly to tool carriers of the type having vibration-damping means incorporated therewith.

As is well known to those skilled in the art, much effort has been expended during the past several years in the development of precision boring machines, adapted, for example, to produce bearing or similar openings, and frequently blind openings, to extremely close dimensions. Of course, whenever the length or depth of such an opening is relatively large in proportion to the opening diameter, difficulty is always encountered because of the chatter or vibration which is induced in the tool carrier. Obviously, as the length or depth of such an opening increases in relation to the opening diameter, the tool carrier, of necessity, is relatively long and slim and thus, will have an increased tendency to vibrate as its tool is drawn over and through the work. Such vibrations impair the accuracy and appearance of the work and shorten the life of the tool.

A primary object of the present invention is to provide a tool carrier having means for preventing and for effectively damping out vibrations which may be excited or induced in the carrier during the operation of the tool.

A further object of the present invention is to provide a tool carrier vibration-damping means which, although most efficient in use, is, at the same time, simple and rugged in nature, and so constructed as to require no attention and adjustment on the part of the machine operator.

A still further object of this invention is to provide such a vibration-free tool carrier which is most inexpensive of manufacture.

Another object of this invention is to provide a tool carrier with vibration-damping means which will be extremely sensitive to the end that it will damp out vibrations of extremely small amplitude, and indeed, prevent the excitation of any steady vibration.

The foregoing objects, and others ancillary thereto, have been attained by the provision of an improved tool carrier having a movable inertia member which is so associated with the tool carrier proper that it functions to dissipate the vibratory energy of the carrier by what appears to be a viscous friction effect.

It is, of course, not new to provide tool carriers and like devices with movable inertia members for the purpose of damping out vibration or chatter. However, most inertia members of the prior art (see for example Leland Patent No. 2,051,954, dated August 25, 1936) have been coupled, both statically and dynamically, to the tool carrier and these depend upon dry or rubbing friction for the damping effect (sometimes called Coulomb damping). This prior art dry friction method of damping dissipates vibrational energy in direct proportion to the velocity of vibration; that is, if said velocity is doubled, the rate of energy dissipation is also doubled.

I have discovered that materially better and more reliable damping of the vibratory tendencies of a tool carrier can be obtained by an inertia weight, which, unlike those of the prior art, is not coupled statically to the carrier, but on the contrary, is so fitted thereto as to be separated therefrom, during the tool's operation, by an extremely thin film of fluid medium (preferably air) whose flow about said weight, as set up by whatever minute relative displacements between carrier and weight may occur, apparently absorbs and dissipates the vibrational energy producing such displacements entirely by said fluid's viscous friction. It is known that such viscous friction method of damping dissipates energy at a rate proportional to the square of the vibrational velocity; for example, if the velocity is doubled, the rate of energy dissipation goes up four-fold. Thus, the energy dissipation by the inertia weight of my invention is far more efficient than in the aforesaid inertia-weighted tool carriers of the prior art.

Furthermore, in the inertia-weighted tool carriers typified by the aforesaid Leland patent, there can be no relative motion between carrier and weight, in response to carrier vibrations until some finite amplitude of vibration is produced, for the reason that the static friction force coupling the two elements together must first be overcome. Therefore, such a method of vibration damping cannot effectively eliminate tool chatter caused by small amplitude vibrations. However, the viscous friction damping method utilized by my invention dissipates vibrational energy at the first sign of any motion between tool carrier and inertia weight, and even though the amplitude of the tool carrier vibration is extremely small.

The invention, both in structure and in operation, as well as the ancillary objects thereof, will be best understood from the following description taken in conjunction with the accompanying drawing in which:

Fig. 1 is a side elevation of a boring head of the type to which the present invention is applicable.

Fig. 2 is a similar view, partly in section, and on an enlarged scale, of the quill or tool holder of Fig. 1, showing my invention applied thereto.

Fig. 3 is a sectional view taken substantially along the line 3—3 of Fig. 2.

Fig. 4 is a view similar to Fig. 2, showing the invention as applied to a modified form of tool holder or quill.

Like reference characters refer to like parts in the different figures.

The present invention is applicable alike to boring and similar machines in which the tool is rotated relative to the work and to boring and similar machines in which the work is rotated relative to the tool. Usually, in both types of such machines, the base provides ways for the reciprocation of a table or carriage on which either the work head or the boring head is mounted, the other of these elements being mounted on a stationary bridge which spans the table ways. Also usually in such machines, the travel of the table in one direction procures a boring operation on the work piece, and thereafter the tool is withdrawn from within the work piece bore by movement of the table in the opposite direction.

Fig. 1 illustrates a boring head for a rotary tool, said head comprising a housing 10 wherein is journaled a spindle 11, preferably on axially spaced bearings, not shown, at opposite ends of the housing. On one end of the spindle is mounted a pulley 12, being held thereon as by a clamping nut 13, and this pulley is connected to a suitable source of power, not shown, for rotation of the spindle. It will be understood that the mechanism which obtains the rotation of the spindle is incorporated in the boring machine between the pulley 12 and the power source.

On the end of the spindle opposite to the pulley 12 is a plate 14 integral with the spindle 11, and to this plate is suitably secured a quill of the construction illustrated in Fig. 2, the same being designated generally by the reference numeral 15. Obviously, according to my invention, the quill 15 and the plate 14 may, if desired, be integrally formed, but as here shown, the quill 15 is a separate unit, to permit use with the boring head of various sizes of boring tools, merely by the removal of one quill and the attachment of a different quill.

Referring particularly to Fig. 2, the quill 15 comprises a substantially cylindrical head portion 16 having a tool carrier or bar portion 17 extending therefrom, concentric with the axis of the head 16 and the spindle 11. The illustrated quill is adapted for boring out a work-piece hole or aperture having a relatively large depth in relation to its diameter and thus, it is to be noted that the bar portion 17 is relatively long and thin, having a length to width ratio of about seven to one. Associated with quill 15 in the usual manner, is a boring tool 18 here shown as extending radially of the bar or carrier 17 near the outer end thereof. More specifically, the tool 18 is carried within a radial bore 19 and is locked in position by means of a set screw 20.

As mentioned, a boring bar or tool carrier of the type disclosed in Fig. 2 is long and slim and thus, self-excited vibrations are readily set up within the bar as the tool 18 is dragged over and through the work. In order to obtain greater accuracy in boring, it is necessary to damp out or eliminate such vibrations. Still referring to Fig. 2, it will be noted that the free end portion of the tool carrier 17 is provided with a cylindrical bore 21 and positioned within this bore is an inertia weight 22. The bore 21 opens out at the end portion of the bar 17 and is adapted after receiving weight 22 to be closed over by means of a plug or cap 23 which is threadedly received within the bore opening as at 24.

In order for relative transverse motion to occur between the inertia weight 22 and the tool carrier 17, the weight 22 is made to have a slight radial clearance with bore 21. I have found that this radial clearance should only be very slight, and the clearance shown in the several drawings has been greatly exaggerated merely for the purpose of illustration. In practice, good results have been obtained with a radial clearance of about .0015 of an inch for quills of ordinary size and vibrational frequency. In some cases, depending upon the diameter and length of the quill, the optimum clearance may be slightly greater or less than .0015 of an inch. From this, it will be understood that as the tool 18 is dragged over and through the work and tends to set up vibration within the tool carrier, the quill will tend to vibrate but the weight 22 due to its inertia will tend to remain stationary. Thus, as this relative motion is produced between the inertia weight and the tool carrier, the surrounding fluid (i. e. the air in the clearance space), being prevented from escaping by cap 23, must flow through the small radial clearances between these elements from one side to the other in the manner of a dashpot. This fluid flow will absorb the vibrational energy of the tool carrier to the end that the tool carrier will remain substantially concentric with the spindle 11 at all times. As it is desirable to have as much inertia as possible, I have found it advantageous to construct the weight 22 of tungsten carbide or heavy tungsten alloys which are heavier than the steel used in the construction of the tool carrier proper, but steel weights may be used with good results. The amount of radial clearance between the inertia weight 22 and the interior walls of the bore 21 is most important, and I have found that if this clearance is too small, the weight will tend to behave as an integral part of the quill and thus, will not effectively damp out the quill's vibration. Also, if the clearance is too large, the resistance to fluid flow will be low, and consequently, the damping action of the weight 22 will be correspondingly impaired.

With such a small radial clearance between the inertia weight 22 and the bore 21, it is not necessary to use any means for positioning the weight 22 in concentric relation to the longitudinal axis of the quill, since the tendency of said weight, when the tool carrier is in operation, is apparently to float within the bore 21. Nor is the damping action of said weight, in a rotating tool carrier, adversely affected, at ordinary operating speeds, by centrifugal force; this is because the pull of gravity on said weight is sufficient to counteract centrifugal force, except at excessively high speeds.

In constructing the above described tool carrier, it is to be particularly understood that the flat end portions of the weight 22 are not intended to engage either the inner end of the plug 23 or the bottom of the bore 21.

In other words, the weight or plug 22 is enough shorter than the space of bore 21 which it occupies, so that no contact occurs. Thus, the present damping means is extremely sensitive, for the reason that no static friction needs to be overcome between the tool carrier and the inertia weight 22 in order to render the inertia weight operative. Also, it should be understood that once the weight 22 has been properly assembled within the tool carrier, no adjustments need thereafter be made, and those skilled in the art will readily appreciate that the present invention lends itself very readily to inexpensive manufacture.

Although in practice very successful results have been obtained with a sealed-in film of air between the inertia weight and the bore walls, other fluids (liquids or gases), may be desirable under different conditions of vibration frequency, clearance and diameter and length of the quill.

In the form of my invention shown by Fig. 4, the inertia weight 22 is located within a bore 21' that lies inwardly of tool 18, enabling the latter to operate in a blind hole. In this form of the invention the bore 21' is closed over by means of an end cap 29 which is threadedly or otherwise received within the bore opening as at 30. This cap is formed with a transverse bore 31 for receiving tool 18 which is secured in place by means of a set screw 20. The radial clearance between weight 22 and bore 21' is very slight, being of the order of .0015 of an inch, in most cases, so that the operation of this form of my invention is the same as described above for the first-described form thereof.

I am aware that it has heretofore been proposed (see Byland Patent No. 2,155,052, April 18, 1939, Means for Destroying the Energy of Mass Oscillation of Solid Bodies) to employ as an inertia weight an annular member of substantially non-elastic material, such as lead, having a "loose seating" upon the rotating shaft or other body whose vibrations are sought to be damped, the damping effect being obtained by successive impacts or collisions between the oppositely moving masses. I make no claim to any such construction or mode of operation, but what I do claim and desire to secure by Letters Patent is as follows:

In a relatively elongated tool carrier for use in a rotary boring operation, wherein said tool carrier is supported at one end with its other end free and susceptible to vibrations transverse to the carrier axis, and wherein a tool is secured to said carrier near the latter's free end, the improvement which consists of a closed cylindrical bore in said carrier adjacent said tool, said bore being coaxial with said carrier, and a cylindrical inertia weight substantially filling said bore such that the radial clearance between said weight and said bore is of the order of .0015 of an inch within the limits of ordinary machining tolerances, whereby said weight is surrounded by a film of air so thin as to serve for the absorption of said carrier's vibrational energy during said boring operation, said inertia weight and said film of air being the sole means occupying said bore.

References Cited in the file of this patent

UNITED STATES PATENTS

| Number | Name | Date |
| --- | --- | --- |
| 1,700,477 | Goode | Jan. 29, 1929 |
| 2,051,954 | Leland | Aug. 25, 1936 |
| 2,155,052 | Byland | Apr. 18, 1939 |
| 2,224,386 | Guild | Dec. 10, 1940 |
| 2,426,359 | Lankheet | Aug. 26, 1947 |
| 2,514,138 | O'Connor | July 4, 1950 |

FOREIGN PATENTS

| Number | Country | Date |
| --- | --- | --- |
| 337,466 | Great Britain | Nov. 3, 1930 |